No. 717,029. Patented Dec. 30, 1902.
E. REYNOLDS.
VALVE FOR AIR COMPRESSORS.
(Application filed May 19, 1898.)
(No Model.) 3 Sheets—Sheet 1.

Witnesses:
Grenville Lewis Jr.
Julia M. Poul.

Inventor:
Edwin Reynolds,
by Dodge and Sons
Attorneys.

No. 717,029. Patented Dec. 30, 1902.
E. REYNOLDS.
VALVE FOR AIR COMPRESSORS.
(Application filed May 19, 1898.)
(No Model.) 3 Sheets—Sheet 2.
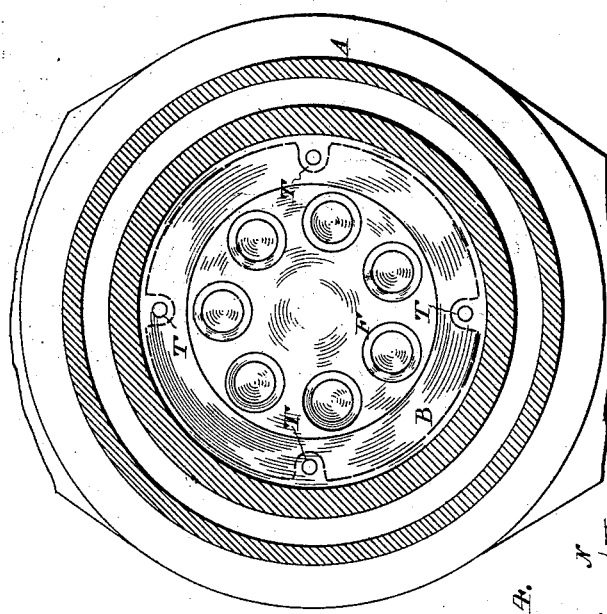
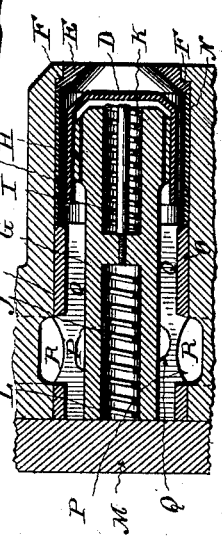
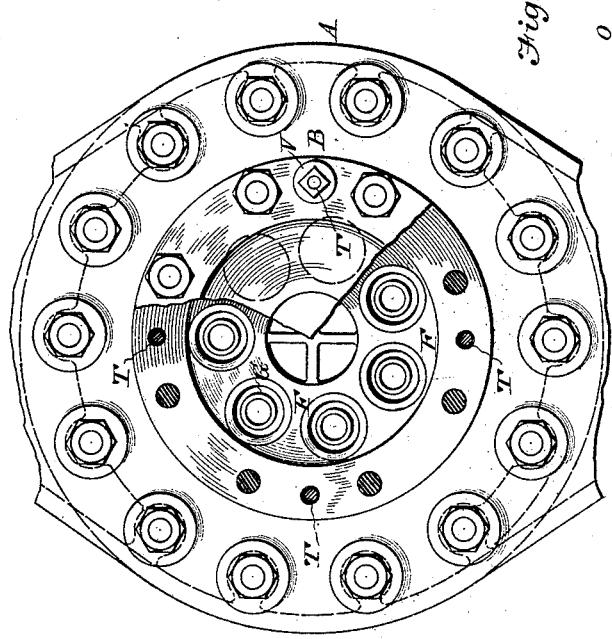
Witnesses
Grenville Lewis Jr.
Julia M. Powel
Inventor:
Edwin Reynolds,
by Dodge and Sons
Attorneys No. 717,029. Patented Dec. 30, 1902.
E. REYNOLDS.
VALVE FOR AIR COMPRESSORS.
(Application filed May 19, 1898.)
(No Model.) 3 Sheets—Sheet 3.

Witnesses
Grenville Lewis Jr.
Julia M. Pond.

Inventor:
Edwin Reynolds,
by Dodge and Sons
Attorneys

UNITED STATES PATENT OFFICE.

EDWIN REYNOLDS, OF MILWAUKEE, WISCONSIN.

VALVE FOR AIR-COMPRESSORS.

SPECIFICATION forming part of Letters Patent No. 717,029, dated December 30, 1902.

Application filed May 19, 1898. Serial No. 681,142. (No model.)

*To all whom it may concern:*

Be it known that I, EDWIN REYNOLDS, a citizen of the United States, residing at Milwaukee, in the county of Milwaukee and State of Wisconsin, (whose post-office address is care Allis-Chalmers Company, Milwaukee, Wisconsin,) have invented certain new and useful Improvements in Valves for Air-Compressors and the Like, of which the following is a specification.

My present invention pertains to valves for air-compressors and blowing-engines, the advantages and construction of which will be hereinafter set forth, reference being had to the annexed drawings, wherein—

Figure 1:
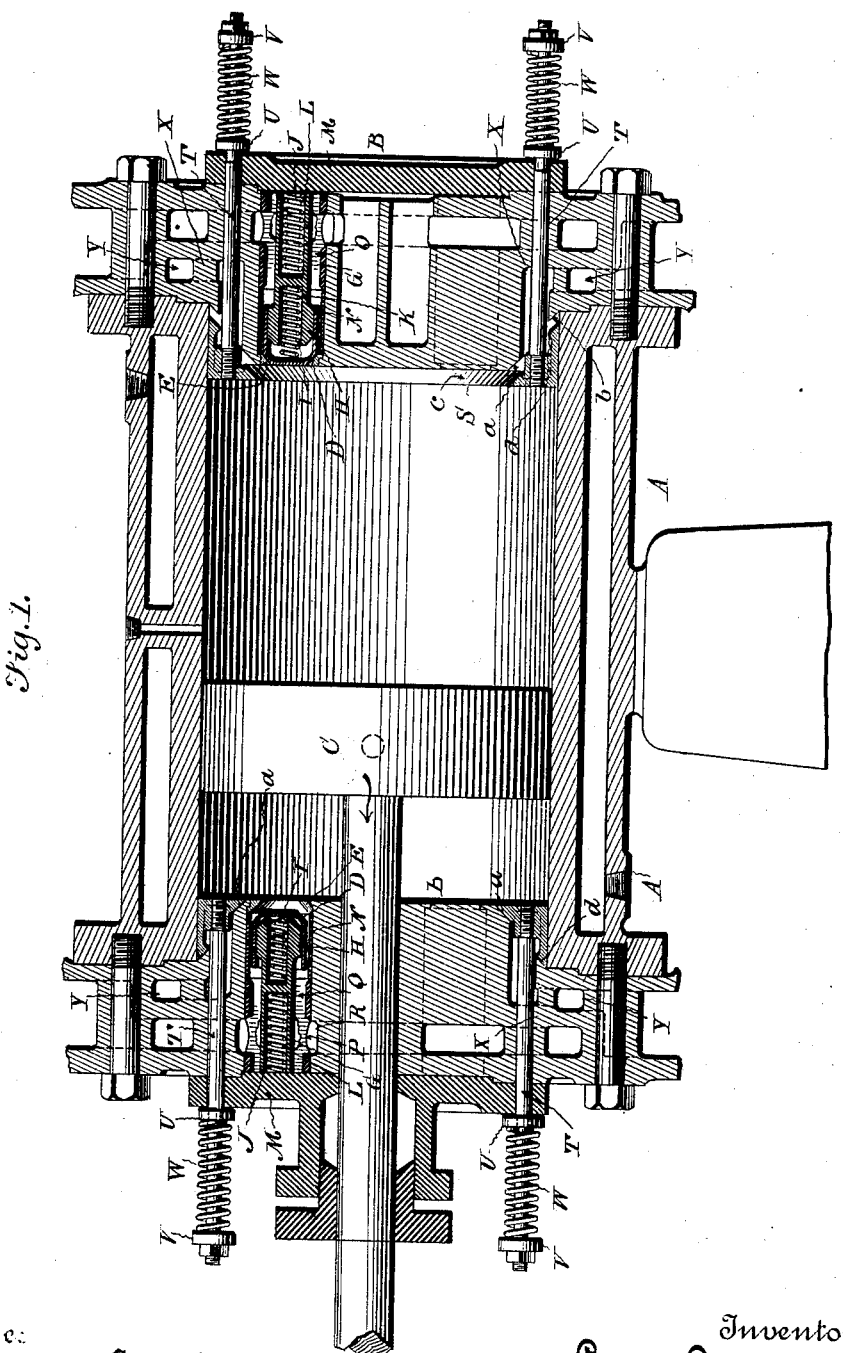
Figure 5:
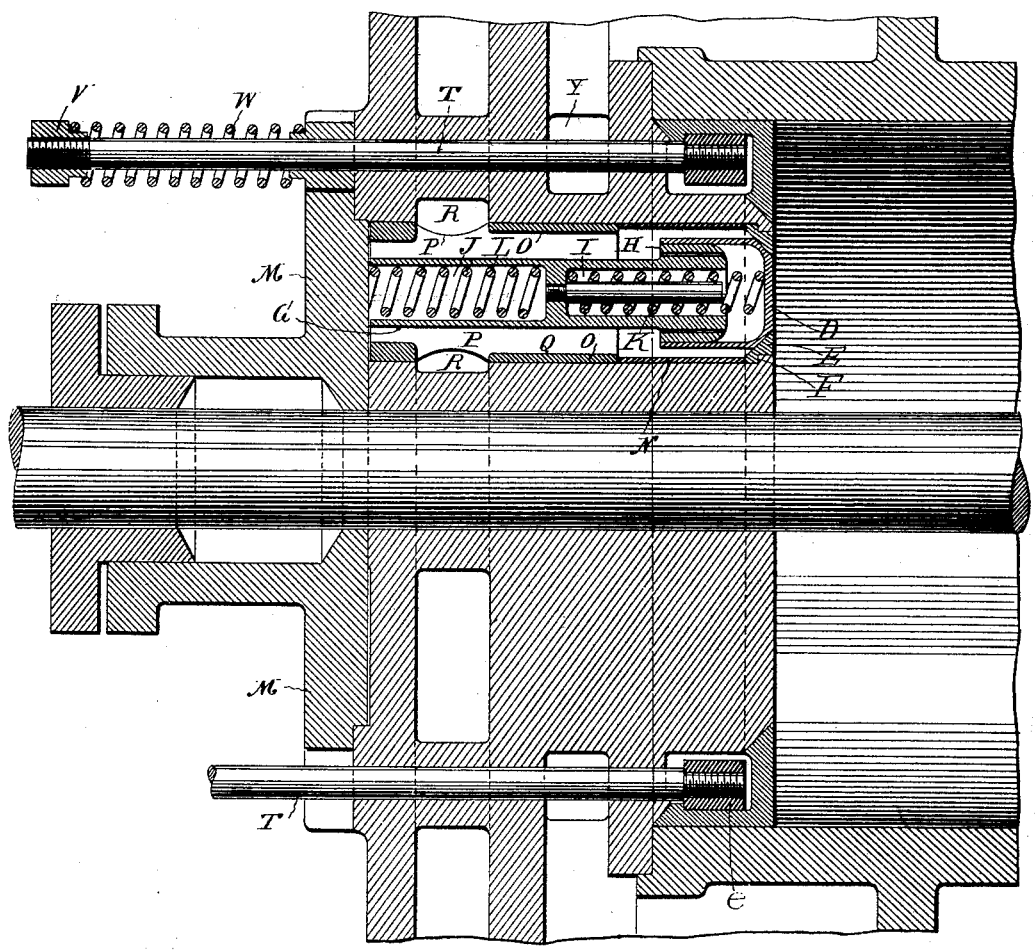
Figure 6:
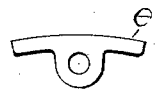
Figure 7:

Figure 1 is a longitudinal sectional view of the compressor-cylinder and the valves; Fig. 2, an end elevation of the cylinder and head with a portion of the cap removed; Fig. 3, a cross-sectional view of the cylinder, showing the inner face of one of the heads and the valves; Fig. 4, a detail sectional view of one of the discharge-valves; Fig. 5, a sectional view illustrating a modified construction of the inlet-valve, and Figs. 6 and 7 detail views of certain portions of the valve-operating mechanism.

The object of my present invention is to provide a simple construction of the valves and to render them compact, while at the same time securing a large and quick inlet.

The construction has also for its object the saving of space in doing away with the clearance necessary with all other types of inlet-valves.

In the drawings, A designates the cylinder, provided with heads B, securely fastened thereto. Mounted and working within the cylinder is a piston C, which may derive its motion from any suitable source.

The discharge-valve comprises a cup-shaped piece D, which when the valve is closed fits against a seat E, the seat fitting against a shoulder F, formed around the opening. To hold said seat to its place and to provide a support for the valve D, a suitable guide (shown in detail in Fig. 4) is employed. It comprises a central stem G, provided with an enlarged head H, over which the valve D works and by which it is guided. Openings H', preferably small, extend through the head, permitting the air at the receiver-pressure to hold the valves D to their seats. The guide is also formed with two pockets I and J, in which suitable springs K and L are mounted, the former bearing against the end of valve D and serving to normally hold it to its seat, while the latter bears against the cap M of the cylinder and holds the guide as a whole up against a cylindrical shell N, which is interposed intermediate the seat E and the outer enlarged portion O of the guide. A stem I' is mounted in the pocket I and serves to keep the spring K in proper position. The enlarged portion O is of such diameter as to just fit within the recess formed in the cylinder-head and is provided with suitable openings P intermediate its ribs Q, which are in line with a port R leading to the receiver. In the construction shown seven of these discharge-valves are employed in each head, they being arranged in a circle concentric with the center of the head. It is of course immaterial how many of these valves are employed, nor need their location be exactly as shown, so long as they do not interfere with the inlet-valve now to be described. Said inlet-valves, one arranged at each end of the cylinder, comprise an annular or ring-shaped piece S, the outer diameter of which makes a mechanical working fit with the inner face of the cylinder against which it works. The inner projecting end of the cylinder-head is beveled, as shown, forming inclined faces or seats *a* and *b*, against which the corresponding faces *c* and *d*, formed upon the rear of valve S, bear when the valve is seated. Rods T— four in the construction shown in Fig. 1—are directly connected to the valve and extend out through the head and cap, projecting quite a distance beyond. The projecting ends are preferably, though not necessarily, reduced slightly and a washer U mounted thereon next to the cap, a similar washer V being secured upon the outer end of the rod and a spring W held between said washers. Suitable ports X for said valve S are formed at intervals around the head, said ports communicating with a common port or channel Y, leading to the atmosphere.

In Fig. 5 a modified form of the inlet-valve is shown. Instead of connecting the rods T directly to the valve, said rods are connected to blocks or hooks *e*. (Shown in detail in Figs.

6 and 7.) The blocks are seated in a channel formed in the rear face of the valve, the outer curved faces of the blocks conforming to the curvature of the channel, and while the valve may turn freely around independently of the blocks the blocks and rods move with it toward and from its seat. It may be desirable to have a slight play of the blocks and valve one to the other, and such construction is shown in Fig. 5, wherein the blocks are slightly narrower than the channel and are shown in engagement with the shoulder or rear wall of the channel. With this construction of the valve it is free to rotate in the cylinder when in operation, and if there is any wear it will be distributed evenly and tend to keep the valve true.

In the relation of the parts shown in Fig. 1 the piston is supposed to be moving toward the left end of the cylinder, the induction or inlet valve S on the right being open and the exit-valves D on the left being forced open, the air in the cylinder ahead of the piston having been compressed to a degree higher than that contained in the receiver. This relation of the valves will be maintained until the piston has completed its stroke to the left. When it begins its return movement, springs K and the pressure in the receiver will close the valve D, and the springs W will draw the right-hand induction-valve S to its seat. As the piston moves to the right, valve S upon the left will be drawn or forced from its seat by reason of the vacuum caused in rear of the piston by its movement, so that air at atmospheric pressure will pass into the cylinder behind the piston. Valves D upon the right will remain closed until the air in front of the piston reaches a degree of compression slightly in excess of that in the receiver, when they will be forced from their seats, permitting the compressed air in the cylinder ahead of the piston to pass on into the receiver. During the commencement of the first part of the operation until a sufficient pressure is had in the receiver spring K serves to close the valve D, but after such pressure has accumulated the air passes in behind the valve through the openings H' and serves to force it to its seat. When the valve D is forced from its seat, the air confined between it and the head H acts as a cushion, gradually finding its way out through said openings H'.

The construction above set forth is compact, and danger from breakage of the parts is reduced to a minimum. Should the inlet-valve become detached, the piston would simply force it back to its seat without fear of breaking any of the parts. In addition to this a large and quick air-inlet is secured.

The drawings show the valves as being operated by atmospheric pressure and compression; but they may be actuated by positive motion, either from an eccentric or other means, and on large cylinders this would probably be advisable.

Having thus described my invention, what I claim is—

1. In combination with a cylinder-head having an opening formed therein; a valve-seat mounted in one end of the opening; a valve; a guide for said valve; and an independent shell N intermediate the guide and valve-seat, substantially as and for the purpose described.

2. In combination with a cylinder-head having an opening formed therein; a valve-seat resting against a shoulder formed at one end of said opening; a valve-guide mounted in said opening having a projecting portion extending out toward the valve-seat; a valve mounted and free to slide on said projecting portion; and an independent shell N mounted in the opening intermediate an enlarged portion of the guide and the valve-seat.

3. In combination with a cylinder-head having an opening extending therethrough; a valve-seat mounted in and resting against a shoulder formed in the forward end of said opening; a valve-guide also mounted in the opening having a central stem G formed with pockets I, J; a head H formed upon the end of the stem; an enlarged portion O connected to the stem by ribs Q, and ports P; a cup-shaped valve mounted upon the head H; a shell N intermediate the valve-seat and the enlarged portion O; and springs K and L mounted in the pockets I and J respectively.

4. In combination with a cylinder; a cylinder-head; and an annular valve working against the interior face of the cylinder and having its seat formed in the cylinder-head in rear of the inner face thereof.

5. In combination with a cylinder; a cylinder-head having an annular valve-seat formed upon its face next to the interior working face of the cylinder and in rear of the inner face of the head; and an annular valve working in the cylinder and adapted to close upon the seat formed upon the head, substantially as described.

6. In combination with a cylinder; a cylinder-head; a valve-seat formed intermediate said head and cylinder; and an annular valve working in the cylinder adapted to close upon the seat.

7. In combination with a cylinder; a cylinder-head; an annular seat formed upon said head next to the interior working face of the cylinder; an annular valve working within the cylinder; and spring mechanism for holding the valve to its seat.

8. In combination with a cylinder; a cylinder-head; a valve-seat formed thereon next to the interior face of the cylinder; ports extending from said seat; a valve; and rods connected to said valve extending through said ports.

9. In combination with a cylinder; a cylinder-head; a valve-seat formed thereon adjacent to said cylinder; ports leading from said seat; a valve; rods connected to said valve extending through the ports out beyond the head; and springs mounted on said rods serving to draw them out and to hold the valve to its seat.

10. In combination with a cylinder; a cylinder-head; and an annular valve working within and against the interior face of the cylinder and adapted when closed to lie flush with the interior face of the cylinder-head.

11. In combination with a cylinder; a cylinder-head connected thereto, and provided with an inclined face adjacent to the working face of the cylinder; and an annular valve provided with a flat face adapted to work against the interior of the cylinder and with an inclined rear face adapted, when closed, to fit upon the inclined face on the head.

12. In combination with a cylinder; a cylinder-head connected thereto; a discharge-valve located wholly within said head; and an independent annular inlet-valve working against the interior face of the cylinder and seating against the cylinder-head, substantially as and for the purpose described.

13. In combination with a cylinder, a cylinder-head; and an annular valve adapted and arranged to lie flush with the face of the cylinder-head when closed, and to move inward within the cylinder in opening, the outer diameter of said valve being equal to that of the interior face of the cylinder against which it works, substantially as described.

14. In combination with a cylinder and its head, an annular valve working in said cylinder the outer face of which makes a mechanical working fit with the inner face of the cylinder.

15. In combination with a cylinder and its head, an annular valve working in said cylinder, the outer face of which makes a mechanical working fit with the inner face of the cylinder, said valve being free to turn and shift its position upon its seat.

16. In combination with a cylinder and its head, an annular valve working within the cylinder against its inner face, said valve being free to turn; and means for moving said valve back upon its seat.

17. In combination with a cylinder and its head, an annular valve working in said cylinder; a channel formed in the rear face of said valve; blocks e mounted in said channel; rods connected to said block and extending out through the head; and means for operating said rods to close the valve.

In witness whereof I hereunto set my hand in the presence of two witnesses.

EDWIN REYNOLDS.

Witnesses:
CYRUS ROBINSON,
B. T. LEUZARDER.